United States Patent [19]

Kantarian et al.

[11] 4,184,579

[45] Jan. 22, 1980

[54] CONVEYOR LOAD STOP AND RELEASE APPARATUS

[76] Inventors: Edward T. Kantarian, 4325 Arlington Dr., Royal Oak, Mich. 48072; Donald F. Staub, 814 Fox Run, Bloomfield Hills, Mich. 48013

[21] Appl. No.: 900,878

[22] Filed: Apr. 28, 1978

Related U.S. Application Data

[63] Continuation-in-part of Ser. No. 838,879, Mar. 6, 1978.

[51] Int. Cl.$^2$ ............................................. B65G 13/00
[52] U.S. Cl. ...................................... 193/35 A; 193/40
[58] Field of Search ...................... 193/35 R, 35 A, 40; 198/491, 492; 221/289, 294

[56] References Cited

U.S. PATENT DOCUMENTS

| | | | |
|---|---|---|---|
| 3,473,642 | 10/1969 | Lorden et al. | 193/35 A |
| 3,891,073 | 6/1975 | Cokman et al. | 193/35 A |
| 3,917,044 | 11/1975 | Brown | 193/40 |
| 3,970,180 | 7/1976 | Schlottmann | 193/35 A |
| 3,990,557 | 11/1976 | Carder | 193/35 A |

*Primary Examiner*—Joseph E. Valenza
*Assistant Examiner*—Gene A. Church
*Attorney, Agent, or Firm*—William T. Sevald

[57] ABSTRACT

Apparatus for selectively by-passing, stopping, and releasing loads traveling on a conveyer having a case equipped with a stop arm and a stop lever on a pivotal stop shaft. The stop arm is swung to a stopping position above the conveyer to stop a load by pivotal movement of the stop shaft and stop lever in one direction and is swung to a non-stopping position not above the conveyer by pivotal movement of the stop shaft and stop lever in the other direction. A blocker leg is pivotally mounted at one end on the case and has an outer end engageable with the stop lever. When the stop arm, stop shaft, and stop lever are in their stopping position for the purpose of stopping a load, a spring or power means swings the blocker leg to abut its outer end against the stop lever so that when the load encounters the stop arm, the inertia and momentum forces of stopping the load is borne by the blocker leg and not borne by the spring or power means. This enables the use of a relatively weak spring and power means as the spring and power means are not required to stop and hold the load.

5 Claims, 16 Drawing Figures

CONVEYOR LOAD STOP AND RELEASE APPARATUS

This application is a continuation in part of our joint application Ser. No. 838,879 filed Mar. 6, 1978, for Conveyer Load Shunting Apparatus.

BACKGROUND OF THE INVENTION

Automatic conveyers are used in industry, commerce and service installations such as the Post Office to handle the transportation of the loads incident to the installation. These conveyers may be hundreds or thousands of feet in length and include cross or connecting conveyers for storage, processing, sorting and other operations. The conveyers may run continuously, such as the main trunk conveyer, and the cross or connecting conveyers may optionally run or not run. All the incoming loads are placed on the main trunk conveyer and borne to the other conveyers. Also processed loads from the cross or connecting conveyers may be returned to the main trunk conveyer for shipment out of the installation. The loads traveling on the main trunk conveyer thus have to be stopped while processed loads from the cross or connecting conveyers are loaded back on to the main trunk conveyer. Many other reasons may necessitate the stopping of loads traveling on the main trunk conveyer such as no available capacity to receive the load on the cross or connecting conveyers, breakdown of equipment, spillage, clean-up, maintainance, shutdown of daily operations, selective stopping of particular loads, etc.

Stop devices are used on the trunk and connecting conveyers to stop loads as desired. These devices are automatic or semi-automatic and respond to signals which may be automatic or semi-automatic. The stop devices of the prior art employ large expensive solenoids or air cylinders to stop the loads with the solenoids or air cylinders bearing the inertia and momentum forces of heavy loads traveling rapidly on the conveyers. If the solenoids and air cylinders were not large and powerful, the forces of the rapidly traveling heavy loads would push the stop positioned by the solenoid or air cylinder out of the way and keep on traveling. In some instances heavy springs are used to place the stop in position and here the springs must be strong enough to withstand the forces of the rapidly traveling loads. To move the stop out of the way against the heavy spring, a large powerful, expensive solenoid or air cylinder is needed to overcome the heavy spring. Heavier electrical wiring and larger air lines are needed to operate the large power means than the ones used on the rest of the control system. Also greater EMF and air supply is required increasing the expense of installation and operation. The stop devices of the prior art are thus large, additionally powered, and expensive.

SUMMARY OF THE PRESENT INVENTION

The novel conveyer load stop and release apparatus of the invention employs a blocker leg to hold against the inertia and momentum of stopping and holding a heavy load on a rapidly moving conveyer instead of the heavy springs and the additionally powered solenoids or air cylinders of the prior art.

A stop shaft is pivotally mounted on a case and has an inner end within the case and an outer end extending relative to the conveyer. A stop arm is radially fixed on the outer end of the stop shaft. Pivotal movement of the stop shaft swings the stop arm into and out of stopping position above the conveyer. A stop lever is fixed on the inner end of the stop shaft and has a stop position corresponding to the stopping position of the stop shaft and stop arm. A blocker leg is pivotally mounted at one end on the case adjacent to and in alignment with the stop lever. The blocker leg has an outer end which lies perpendicular to the pivotal mounting of its one end when the blocker leg outer end abuts the stop lever when the stop lever is in stopping position for the purpose of stopping a load.

Loads traveling on the conveyer are stopped by encountering the stop arm in stopping position with the blocker leg outer end engaging the lever thereby preventing swinging movement of the stop lever, pivotal movement of the stop shaft, and swinging movement of the stop arm. The entire inertia and momentum forces of stopping a heavy load traveling on a rapidly moving conveyer is thus borne by the blocker leg and not by a spring, air cylinder, and/or solenoid. Thus relatively small inexpensive springs, solenoids, air cylinders, wiring, air lines, EMF and air supply are suitable to actuate the parts to the stopping and blocking position as the springs, solenoids, air cylinders, etc. do not bear the force of stopping and holding the load. They only position the freely moving parts.

The apparatus of the invention is thus inexpensive to manufacture and maintain; is simple in design, construction and operation; does not oppose springs, air cylinders, and solenoids against the forces of the loads on the moving conveyer thereby providing long life and reduced breakdowns and downtime of the equipment; allows inexpensive installation and operating costs; and provides a mechanical, relatively certain stop of which there is little liklihood that the forces encountered will overcome the stop apparatus to allow the load to continue traveling past the stop station on the conveyer.

The foregoing is explained more fully in the detailed description hereinafter set forth taken in connection with the accompanying drawings now described.

DETAILED DESCRIPTION OF THE ILLUSTRATED EMBODIMENTS

Figure 1:
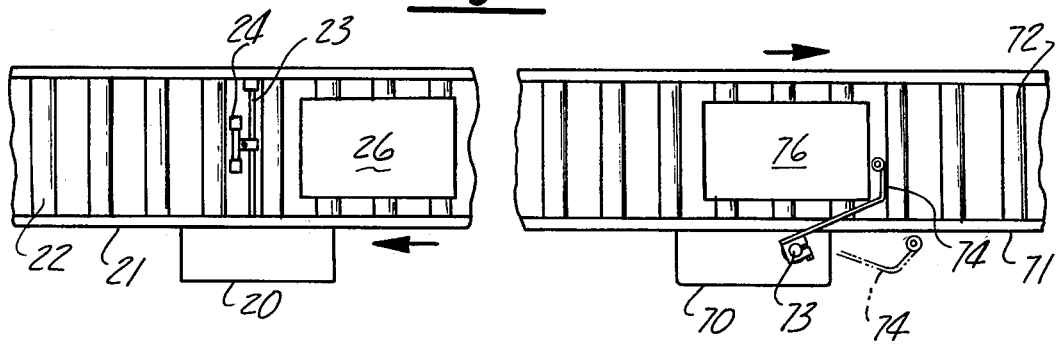
FIG. 1 is a top plan view of a conveyer, with the portions broken away, showing an "under the arm" embodiment of the invention at the left on one conveyer and a "side-arm" embodiment of the invention at the right on another conveyer with both embodiments shown in the load stopping position to loads shown diagrammatically on the conveyer, and showing the non-stopping position of the side-arm embodiment in broken lines.
Figure 2:
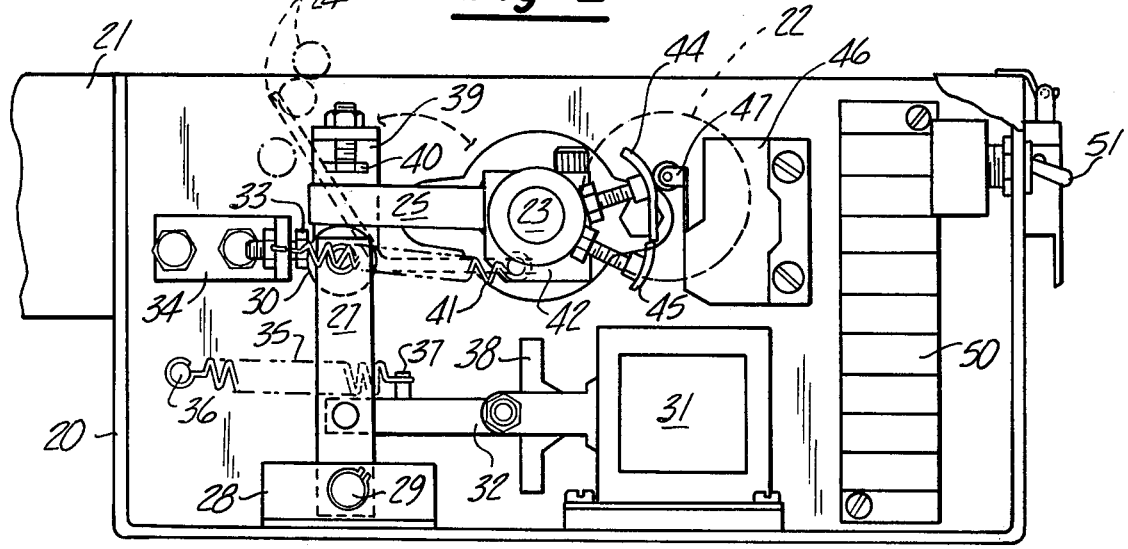
FIG. 2 is an enlarged face elevational view of the under-arm embodiment, with the cover of the case broken away to reveal the internal parts, showing the apparatus in the stopping position and indicating the stop arm and a conveyer roller in broken lines.

Referring now to the drawings wherein like reference numerals refer to like and corresponding parts throughout the several views, the illustrated exemplary embodiments of the invention shown therein include an under-arm embodiment, FIGS. 1 to 4 and 8 to 11, and a side-arm embodiment, FIGS. 1, 5 to 7, and 12 to 15.

(Under-arm embodiment)

The under-arm embodiment FIGS. 1 to 4 comprises a case 20 attached to a conveyer 21. A stop-shaft 23 projects horizontally from the case 20 and extends into the conveyer 21 below the load carrying surface of the rollers 22. A stop arm 24 is connected on the stop-shaft 23 and extends radially therefrom. Rocking motion of the stop shaft 23 in one direction moves the stop arm 24 above the conveyer rollers 22 to stop a load 26 and in the other direction moves the stop arm 24 below the conveyer rollers 22 to allow a load to by-pass. The stop shaft 23 and stop arm 24 are shown in the load 26 stopping position, FIGS. 1 and 2 and in the non-stopping position FIG. 3.

A stop lever 25 is secured to the stop shaft 23 internally of the case 20. A blocking leg 27 is pivotally mounted on a pin 29 supported on a flange 28 welded on the case 20. A wheel 30 is carried by the blocking leg at its outer end. The wheel 30 engages the stop lever 25. A solenoid 31 is attached to the case 20. A link 32 is connected between the solenoid 31 and the blocking leg 27. An adjustable abutment 33 is carried by a flange 34 bolted on the case 20. A spring 35 has one end anchored on the case at 36 and the other end connected to a peg 37 on the link 32. The spring 35 resiliently moves the blocking leg 27 against the abutment 33 and pulls the armature 38 of the solenoid 31 to its non-energized position.

Figure 3:
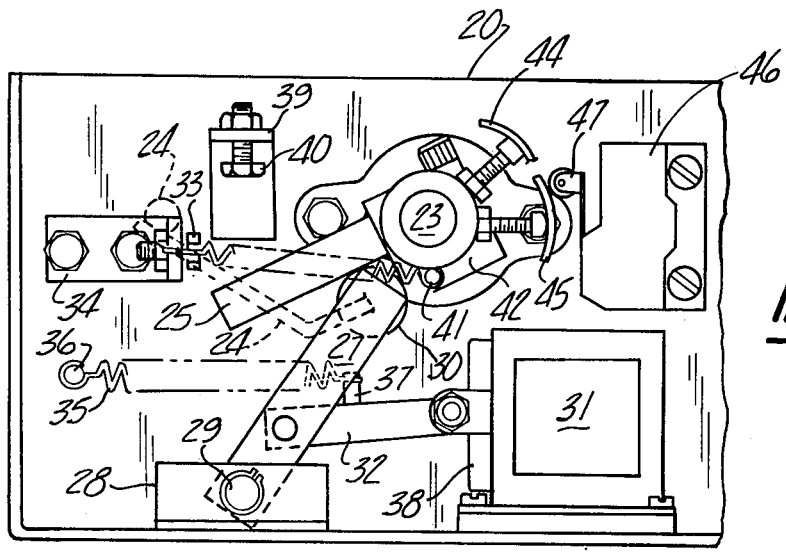
FIG. 3 is a view similar to FIG. 2, with the right end portion broken away, showing the under-arm apparatus in the non-stopping position.
Figure 4:
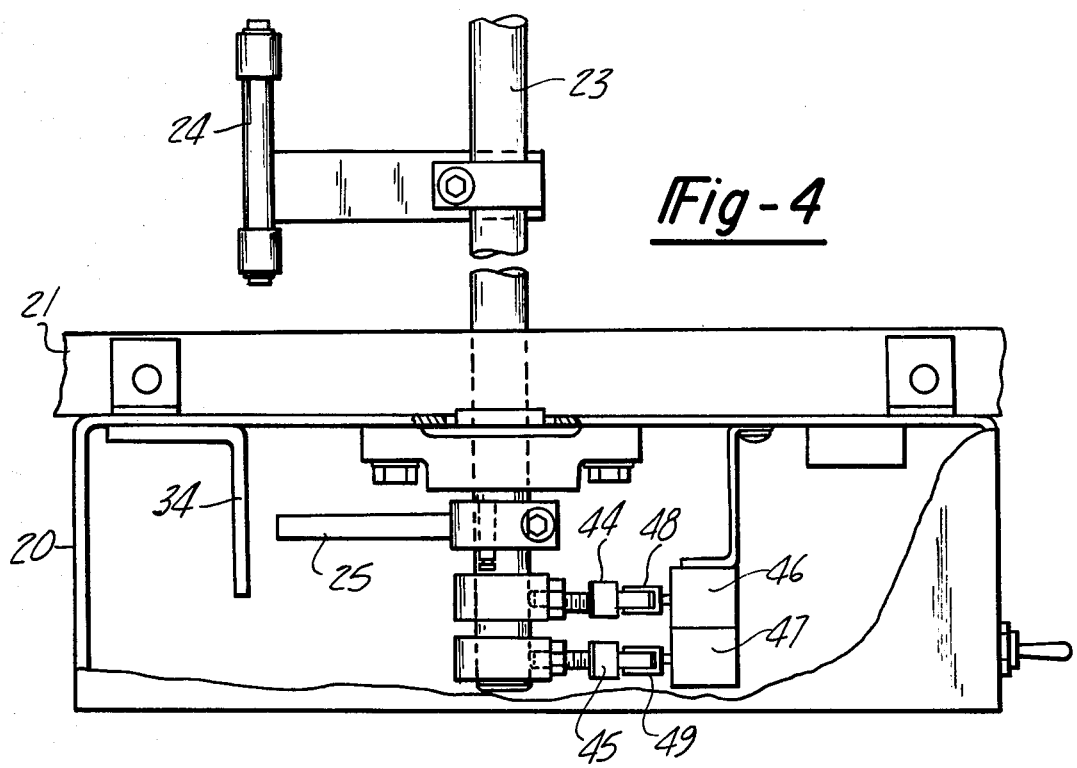
FIG. 4 is a top plan view of the under-arm apparatus seen in FIGS. 2 and 3, with the cover of the case broken away to reveal internal parts.
Figure 16:
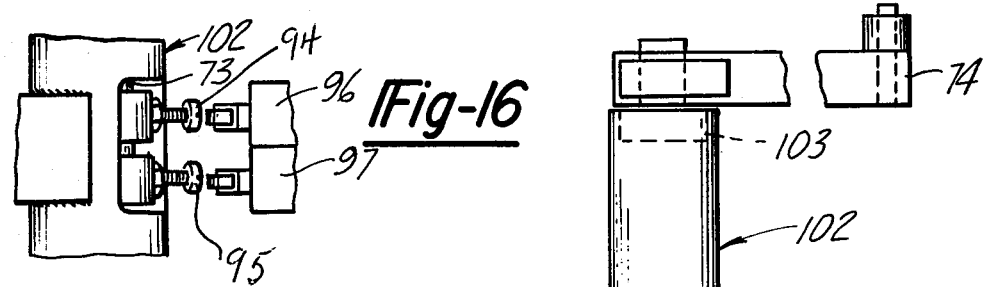
FIG. 16 is a partial view of the mast portion of FIG. 5 as seen from the left with parts broken away showing the switches, switch arms, and switch cams in more detail.
Figure 5:
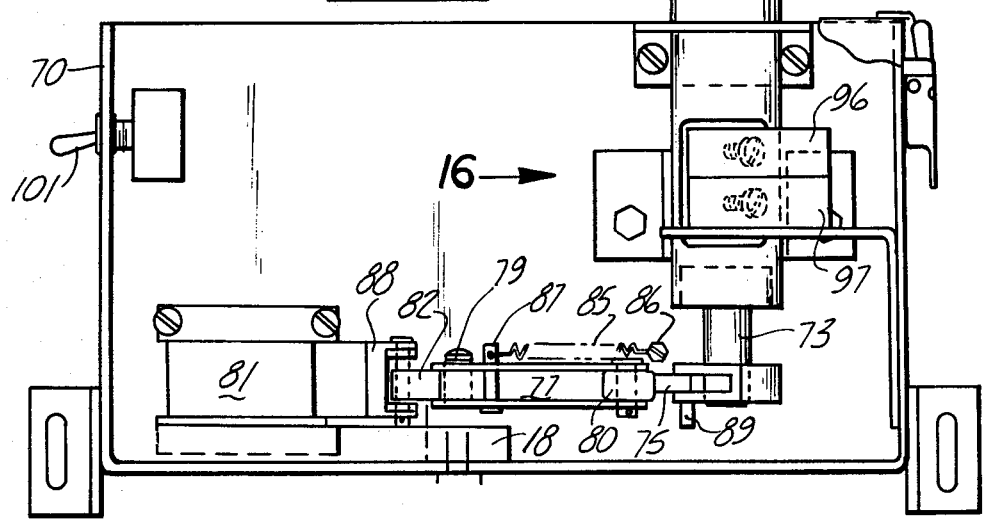
FIG. 5 is an enlarged face elevational view of the side-arm embodiment, with the cover of the case broken away to reveal the internal parts, showing the apparatus in the stopping position.
Figure 6:
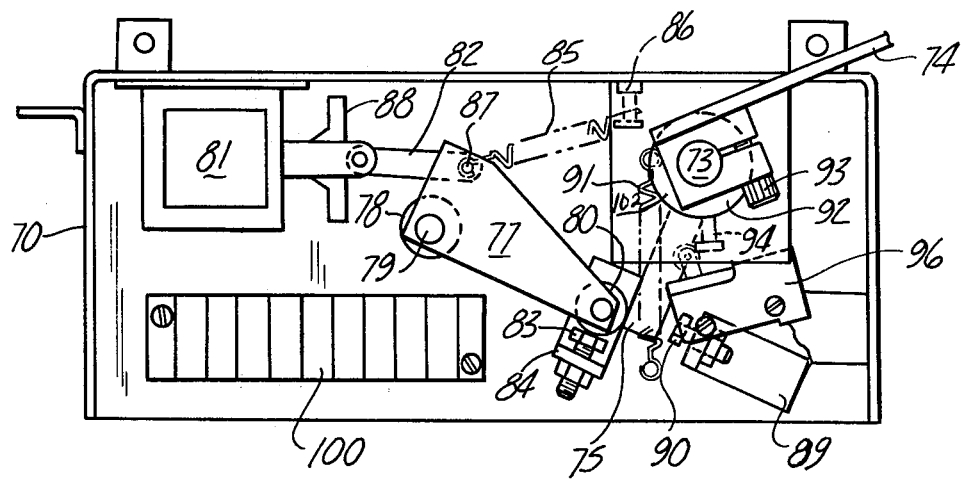
FIG. 6 is a top elevational view of the apparatus seen in FIG. 5, with the cover of the case removed to show internal parts, showing the side-arm apparatus in the stopping position.

A flange 39 supports an adjustable abutment 40 relative to the stop lever 25. A spring 41 is connected at one end to the hub 42 of the stop lever 25 and is anchored at its other end on the flange 34. Thus the spring 41 resiliently positions the stop lever 25 in the stopping position and the spring 36 resiliently positions the blocking leg 27 in blocking position, FIG. 2, with the solenoid 31 de-energized. When the solenoid 31 is energized, it swings the blocker leg 27 to non-blocking position, FIG. 3. FIG. 3 also illustrates that the load 26 traveling on the conveyer 21 has encountered the stop arm 24 and has pushed it down and against the resilience of the spring 41 out of the way of the load 26 which in turn pivots the stop shaft 23 and swings the stop lever 25 to non-stopping position.

However, should the solenoid 31 not be energized, the spring 35 places the blocking leg 27 in blocking position relative to the stop lever 25, and the stop lever 25 prevents the stop shaft 23 from pivoting and the stop arm 24 from swinging down so that the stop arm 24 stops the load 26.

The stop lever hub 42 is split and is secured on the stop shaft by the bolt 43. The stop shaft 23 may also carry adjustable cams 44 and 45 for actuating two switches 46 and 47. The switches 46–47 have arms 48 and 49 respectively with one actuated by the cam 44 and the other by the cam 45. The terminal plate 50 is screwed on the case 20 and a test switch 51 is mounted on the case 20 for checking the operability of the apparatus. The switches 46–47, arms 48–49, and cams 44 and 45 are provided to control the solenoid 31 relative to its energized and non-energized states from remote positions in the system or by the test switch 51. Thus a load may be stopped on signal from a remote point selectively, automatically and/or manually as desired.

Figure 9:
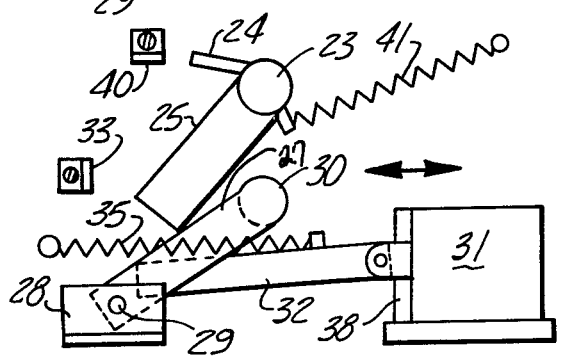
FIG. 9 is a diagrammatic showing of the stop lever, blocking leg, solenoid connected to the blocking leg, and tension springs connected to the stop lever and blocking leg of the under-arm embodiment illustrating a mode of the apparatus wherein the apparatus is positioned in the non-stopping and non-blocking position with the spring to the stop lever locating it in the non-stopping position and showing the solenoid energized to locate the blocking leg in non-blocking position.
Figure 10:
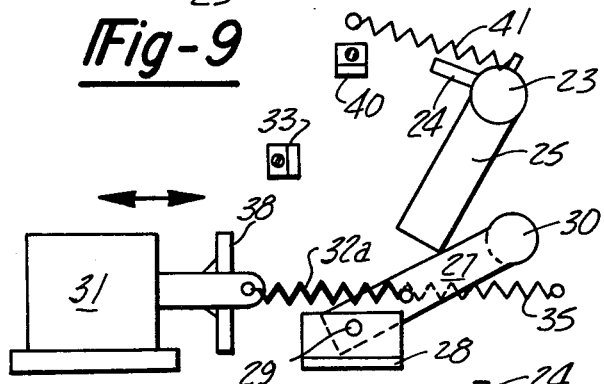
FIG. 10 is a diagrammatic showing of the stop lever, blocking leg, solenoid connected to the blocking leg, and tension springs connected to the stop lever and blocking leg of the under-arm embodiment illustrating a mode of the apparatus wherein the apparatus is positioned in the non-stopping and non-blocking position with the solenoid not energized and the parts movable to the stopping and blocking position by energizing the solenoid to swing the blocking leg to the blocking position during which motion the blocking leg cams the stop lever to stopping position.
Figure 11:
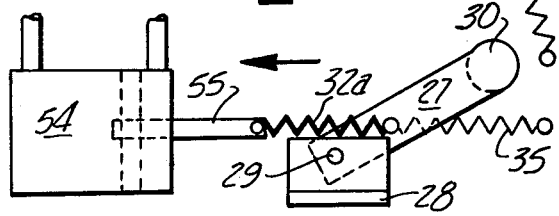
FIG. 11 is a diagrammatic showing of the stop lever, blocking leg, air cylinder connected to the blocking leg, and tension springs connected to the stop lever and blocking leg of the under-arm embodiment illustrating a mode of the apparatus wherein the apparatus is positioned in the resiliently non-stopping condition and non-blocking position with the stop lever resiliently movable by a load on the conveyer to by-pass the load and the air cylinder not powered and when powered moving the blocking leg to blocking position against the stop lever to block the stop lever in its stopping position to stop a load on the conveyer.

A bearing 52 supports the stop shaft 23 on the case 20 and an outboard bearing 53 supports the projecting end of the stop shaft 23 on the conveyer 21. In the apparatus of FIG. 11 an air cylinder 55 provides the actuating force instead of the solenoid 31. In FIGS. 9 and 10 the link 32 is not used and a heavy spring 32A is used instead to provide the facility of allowing the solenoid 31 to pull in when energized to prevent damage in the event the parts are jammed against motion such as by a load 26 or a group of loads 26.

(Side-arm embodiment)

The side-arm embodiment FIGS. 1 and 5–7 comprises a case 70 attached to a conveyer 71. A stop shaft 73 projects vertically from the case 70 and extends upwardly adjacent to the load carrying surface of the rollers 72. A stop arm 74 is connected on the stop shaft 73 and extends radially therefrom. Rocking motion of the stop shaft 73 in one direction swings the stop arm 74 over the conveyer rollers 72 to stop a load 76 and in the other direction moves the stop arm 74 from over the conveyer rollers 72 to allow a load 76 to by-pass. The stop shaft 73 and arm 74 are shown in the stopping position in FIGS. 5 and 6 and in the non-stopping position in FIG. 7.

A stop lever 75 is secured to the stop shaft 73 internally of the case 70. A blocking leg 77 is pivotally mounted by a pin 79 supported on a flange 78 welded on the case 70. A wheel 80 is carried by the blocking leg 77 at its outer end. The wheel 80 engages the stop lever 75. A solenoid 81 is attached to the case 70. A link 82 is conneced between the solenoid 81 and the blocking leg 77. An adjustable abutment 83 is carried by a flange 84 bolted on the case 70. A spring 85 has one end anchored on the case at 86 and the other end connected to a peg 87 on the link 82. The spring 85 resiliently moves the blocking leg 77 against the abutment 83 and pulls the armature 88 of the solenoid 81 to its non-energized position.

Figure 7:
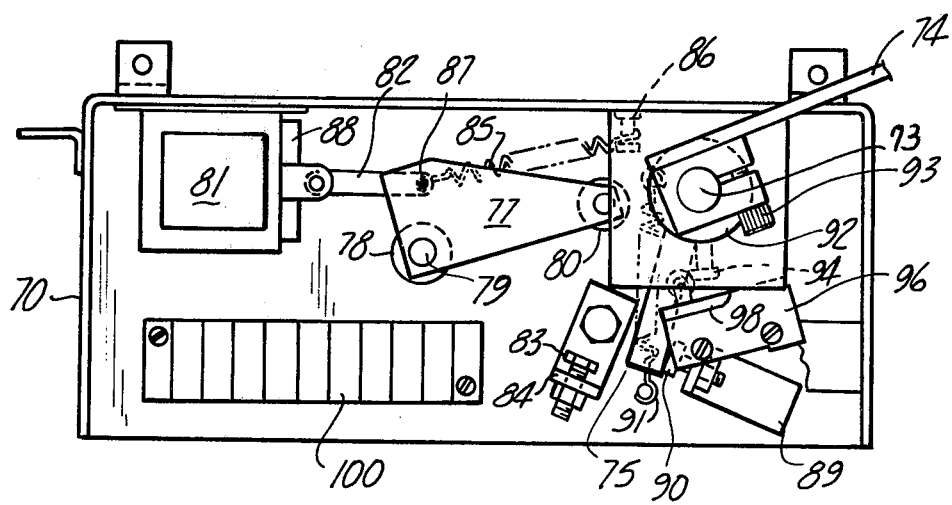
FIG. 7 is a view similar to FIG. 6 showing the side-arm apparatus in the non-stopping position.

A flange 89 supports an adjustable abutment 90 relative to the stop lever 75. A spring 91 is connected at one end to the hub 92 of the stop lever 75 and is anchored at its other end on the flange 84. The spring 91 resiliently positions the stop lever 75 in the stopping position and the spring 85 resiliently positions the blocking leg 77 in blocking position with the solenoid 81 de-energized, FIGS. 5–6. When the solenoid 81 is energized, it swings the stop lever 75 to non-bocking position, FIG. 7. FIG. 7 also illustrates that the load 76 traveling on the conveyer 71 has encountered the stop arm 74 and has pushed it away against the resilience of the spring 91 out of the way of the load 76 which in turn pivots the stop shaft 73 and swings the stop lever 75 to non-stopping position when the solenoid 81 is energized. When the solenoid 81 is not energized, the spring 85 places the blocking leg 77 in blocking position relative to the stop lever 75, and the stop lever 75 prevents the stop shaft 73 from pivoting and the stop arm 74 from swinging away from over the conveyer so that the stop arm 74 stops the load 76.

The stop lever hub 92 is split and is secured on the stop shaft 73 by the bolt 93. The stop shaft 73 may also carry adjustable cams 94 and 95 for actuating two switches 96 and 97. The switches 96 and 97 have arms 98 and 99 respectively with one actuated by the cam 94 and the other by the cam 95. The terminal plate 100 is screwed on the case 70 and a test switch 101 is mounted on the case 70 for checking the operability of the apparatus. The switches 96–97, arms 98–99, and cams 94 and 95 are provided to control the solenoid 81 relative to its energized and non-energized states from remote positions in the system or by the test switch 101. Thus a load 76 may be stopped on signal from a remote point selectively, automatically and/or manually as desired. A tubular mast 102 is secured to the case 70 and has internal bearings 103 supporting the stop shaft 73 within the case 70 and at a point remote from the case 70 and adjacent the stop arm 74.

Figure 13:
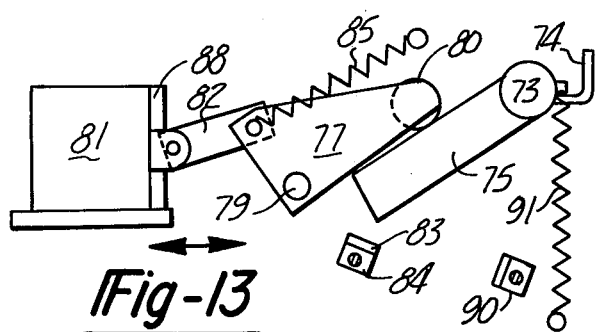
FIG. 13 is a diagrammatic showing of the stop lever, blocking leg, solenoid connected to the blocking leg, and tension springs connected to the stop lever and blocking leg of the side-arm embodiment illustrating a mode of the apparatus wherein the apparatus is positioned in the non-stopping and non-blocking position with the spring to the stop lever locating it in the non-stopping position and showing the solenoid energized locating the blocking leg in the non-blocking position.
Figure 14:
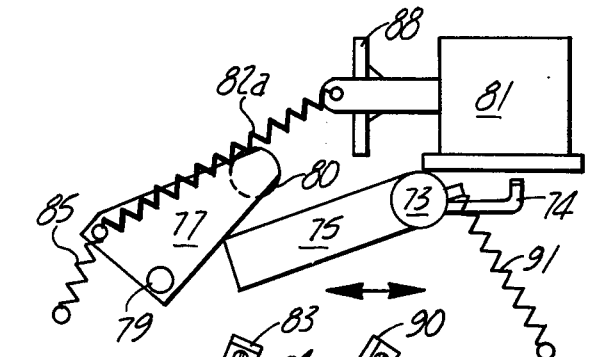
FIG. 14 is a diagrammatic showing of the stop lever, blocking leg, solenoid connected to the blocking leg, and tension springs connected to the stop lever and blocking leg of the side-arm embodiment illustrating a mode of the apparatus wherein the apparatus is positioned in the non-stopping and non-blocking position with the solenoid not energized and the parts movable to the stopping and blocking position by energizing the solenoid to swing the blocking leg to the blocking position during which motion the blocking leg cams the stop lever to stopping position.
Figure 15:
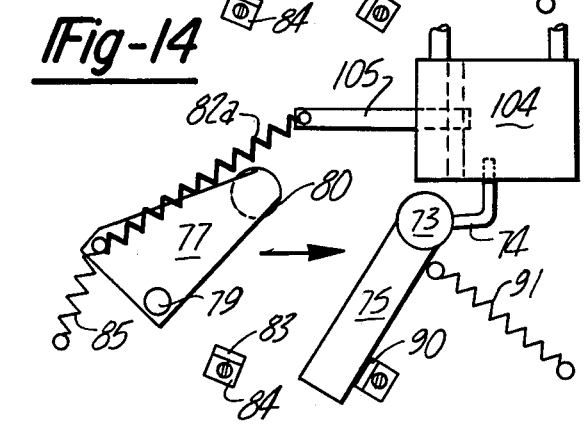
FIG. 15 is a diagrammatic showing of the stop lever, blocking leg, air cylinder connected to the blocking leg, and tension springs connected to the stop lever and blocking leg of the side-arm embodiment illustrating a mode of the apparatus wherein the apparatus is positioned in the resiliently non-stopping and non-blocking position with the stop lever resiliently movable by a load on the conveyer to by-pass the load and the air cylinder not powered and when powered moving the blocking leg to blocking position against the stop lever to block the stop lever in its stopping position to stop a load on the conveyer.

In the apparatus of FIG. 15 an air cylinder 104 provides the actuating force instead of the solenoid 81. In the apparatus of FIGS. 13 and 14 the link 82 is not used and a heavy spring 82A is used instead to provide the facility of allowing the solenoid 81 to pull in when energized to prevent damage in the event the parts are jammed against motion as by a load 76 or a group of loads 76.

MODES OF CONSTRUCTION AND OPERATION

There are two principal embodiments of the apparatus of the invention. Embodiment one employs a straight bar blocker leg and embodiment two employs a bell-crank blocker leg. The following drawings show the modes described for both embodiments.

Figure 8:
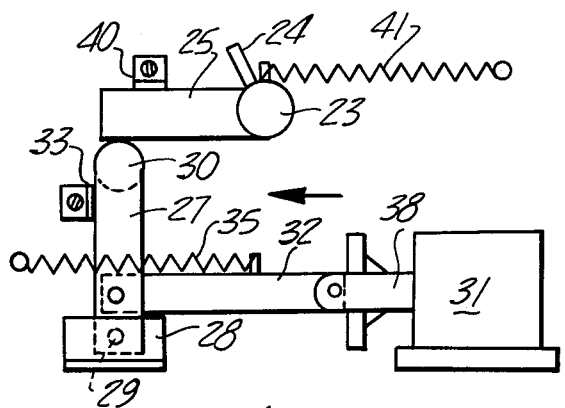
FIG. 8 is a diagrammatic showing of the stop lever, blocking leg, solenoid connected to the blocking leg and tension springs connected to the stop lever and blocking leg of the under-arm embodiment illustrating a mode of the apparatus wherein the apparatus is positioned in the stopping and blocking position and the solenoid not energized and when energized moving the blocking leg to an unblocking position leaving the stop lever resiliently movable against its spring to allow loads to by-pass.
Figure 12:
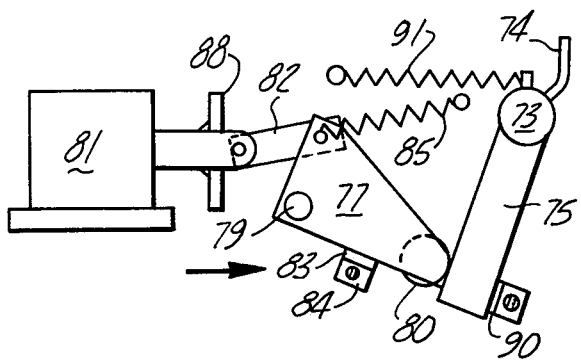
FIG. 12 is a diagrammatic showing of the stop lever, blocking leg, solenoid connected to the blocking leg, and tension springs connected to the stop lever and blocking leg of the side-arm embodiment illustrating a mode of the apparatus wherein the apparatus is positioned in the stopping and blocking position and the solenoid not energized and when energized moving the blocking leg to an unblocking position leaving the stop lever resiliently movable against its spring to allow loads to by-pass.

There are four exemplary modes of integrating the various elements of the two embodiments of the apparatus of the invention to suit desired operational conditions of the system and results as follows:

| modes | stop arm, shaft, and lever in position | blocking leg in position | power means |
|---|---|---|---|
| I. FIGS. 8 and 12 | Stopping (resilient) (by-pass) | blocking | energized to unblock |
| II. FIGS. 9 and 13 | stopping | blocking | energized to unblock |
| III. FIGS. 10 and 14 | Non-stopping | not-blocking | energized to block |

| modes | stop arm, shaft, and lever in position | blocking leg in position | power means |
| --- | --- | --- | --- |
| IV. FIGS. 11 and 15 | stopping (resilient) (by-pass) | not-blocking | energized to block |

Mode I, FIGS. 8 and 12, is suitable for location on a system where the load must be stopped, such as at the end of a trunk or connecting conveyer, where loads must be inspected; and where loads must be identified as going to various stations. Here each load is assured of being stopped thereby insuring that proper processing, inspection, identification, etc., and also insuring against pile-up by running off the end of the conveyer. This mode provides for an energized power means to establish the non-blocking condition with the blocking condition being established by de-energizing the power means.

In the under-arm embodiment of FIG. 8, the spring 41 resiliently holds the stop lever 25, shaft 23, and arm 24 in the stop position and the spring 35 holds the blocker leg 27 in blocking position. To permit by-passing of loads 26, the solenoid 31 is energized moving the blocker leg 27 to non-blocking position. This allows the load 26 to depress the stop arm 24 out of the way as allowed by the spring 41.

In the side-arm embodiment of FIG. 12, the spring 91 resiliently holds the stop lever 75, shaft 73 and arm 74 in stopping position and the spring 85 holds the blocker leg 77 in blocking position. To permit by-passing of loads 76, the solenoid 81 is energized moving the blocker leg 77 to non-blocking position. This allows the load 76 to swing the stop arm 74 out of the way as allowed by the spring 91. This mode is unidirectionally by-passable as indicated by the arrow.

Mode II, FIGS. 9 and 13, are shown in the load by-pass position with the solenoid energized. When the solenoid is not energized the spring to the blocker leg swings the blocker leg to blocking position and its wheel cams the stop lever to stopping position against its spring. When the solenoid is energized as shown, the blocker leg is moved away from the stop lever and the spring to the stop lever swings it and the stop shaft and stop arm to non-stopping position.

In the under-arm embodiment of FIG. 9, the spring 41 resiliently holds the stop lever 25, shaft 23 and arm 24 in the non-stopping position. The solenoid 31 when energized as shown holds the blocker leg 27 in non-blocking position. This allows bi-directional by-passing of loads 26 as indicated by the double arrow. To stop a load 26, the solenoid 31 is de-energized and the spring 35 pulls the blocker leg 27 to blocking position. When the blocker leg 27 moves to blocking position, it cams via its wheel 30 the stop lever 25, shaft 23, and arm 24 to the stopping position to stop a load 26.

In the side-arm embodiment of FIG. 13, the spring 91 resiliently urges the stop lever 75, shaft 73 and arm 74 to the non-stopping position. The solenoid 81 when energized as shown holds the blocker leg 77 in non-blocking position. This allows bi-directional by-passing of a load 76 as indicated by the double arrow. To stop a load 76, the solenoid 81 is de-energized and the spring 85 pulls the blocker leg 77 to blocking position. When the blocker leg 77 moves to blocking position, it cams via its wheel 80 the stop lever 75, shaft 73 and arm 74 to the stopping position to stop a load 76.

Mode III, FIGS. 10 and 14, the stop lever lies camwise engaged by the blocker leg in the non-stopping position of the stop lever and the non-blocking position of the leg when the power means is not energized as shown. Upon the power means being energized, the blocker leg cams the stop lever to the stop position and this pivots the stop shaft and stop arm to stop a load on the conveyer.

In the under-arm embodiment of FIG. 10, the spring 41 resiliently holds the stop lever 25, shaft 23 and arm 24 in non-stopping position and the spring 35 holds the blocker leg 27 in non-blocking position. This allows bi-directional by-passing of a load 26 as indicated by the double arrow. To stop a load 26, the solenoid 31 is energized and it swings the blocker leg 27 to blocking position with its wheel 30 camming the stop lever 25, shaft 23 and arm 24 to stopping position. It is to be noted that the heavy spring 32A overcomes the relatively light springs 35 and 41 to so move the parts.

In the side-arm embodiment of FIG. 14, the spring 91 resiliently holds the stop lever 75, shaft 73 and arm 74 in the non-stopping position and the spring 85 holds the blocker leg 77 in non-blocking position. This allows bi-directional by-passing of a load 76 as indicated by the double arrow. To stop a load 76, the solenoid 81 is energized and it swings the blocker leg 77 to blocking position with its wheel 80 camming the stop lever 75, shaft 73 and arm 74 to stopping position.

Mode IV, FIGS. 11 and 15, when the power means is not energized, a spring moves the blocker leg to move to its non-blocking position and a spring urges the stop lever, shaft and arm to a resilient load by-passable position. A spring resiliently urges the blocking leg to its non-blocking position and pulls the air-cylinder to its rest position. To stop a load, the air-cylinder pulls the blocker leg to blocking position against the stop lever and this prevents the load from moving the stop arm and the stop arm stops the load.

In the under-arm embodiment of FIG. 11, the spring 41 resiliently holds the stop lever 25, shaft 23 and arm 24 in stop position and the spring 35 holds the blocker leg 27 in non-blocking position. This allows uni-directional by-passing of loads 26 with the load 26 deflecting the stop arm 24, shaft 23 and lever 25 as indicated by the arrow. To stop a load 26 the air-cylinder 54 moves the piston rod 55 inwardly pulling the blocker arm to blocking position with its wheel 30 abutting the stop lever 25. The heavy spring 32A overcomes the relatively light spring 35 when the piston rod 55 pulls the blocker leg 27 to blocking position.

In the side-arm embodiment of FIG. 15, the spring 91 resiliently holds the stop lever 75, shaft 73 and arm 74 in stop position and the spring 85 holds the blocker leg 77 in non-blocking position. This allows uni-directional by-passing of loads 76 with the load 76 deflecting the stop arm 74, shaft 73 and lever 75 as indicated by the arrow. To stop a load 76, the air-cylinder 104 moves the piston rod 105 inwardly pulling the blocker leg 77 to blocking position with its wheel 80 abutting the stop lever 75. The heavy spring 82A overcomes the relatively light spring 85 when the piston rod 105 pulls the blocker leg 77 to blocking position.

While various parts, arrangements, and components of the apparatus of the invention have been shown and described specifically, it will be understood that various adaptations, equivalents, and substitutions can be made within the scope of the invention and appended claims which define the protective scope of the invention.

We claim:

1. Apparatus for selectively by-passing, stopping, and releasing loads traveling on a conveyer, comprising, a case mountable on a conveyer, a stop shaft pivotally mounted on said case; said stop shaft having an inner portion within said case and an outer portion extending from said case for positioning relative to the load carrying surface of a conveyer;

a stop arm on said stop shaft outer portion movable by angular motion of said shaft in one direction to a stopping position above the load carrying surface of a conveyer to stop a load and movable by angular motion of said shaft in the opposite direction to a non-stopping position not above the load carrying surface of a conveyer to not stop a load;

a stop lever on said stop shaft inner portion having a stopping position and a non-stopping position corresponding to said stop shaft and said stop arm;

first spring means resiliently angularly biasing said stop lever, said stop shaft, and said stop arm in one of their stopping and non-stopping positions;

a blocker leg having one end pivotally mounted on said case and an outer end swingable to engage said stop lever to support said stop lever, said stop shaft, and said stop arm in their stopping position against the impact and force incurred in stopping a load on a conveyer;

said blocker leg being swingable to a position not blocking said stop lever to allow said stop lever, said stop shaft, and said stop arm to move to their non-stopping position;

second spring means biasing said blocker leg to one of its said blocking and not-blocking positions; and power means for selectively swinging said blocker leg against said second spring means between its blocking and non-blocking positions relative to said stop lever.

2. In apparatus as set forth in claim 1, said first spring means resiliently urging said stop lever, said stop shaft, and said stop arm in their stopping positions;

said second spring means resiliently pivoting said blocker leg in blocking relationship to said stop lever;

said power means being energized to swing said blocker leg against said second spring means out of blocking relationship relative to said stop lever;

said first spring means allowing deflection of said stop arm by loads traveling on a conveyer to pivot said stop shaft and said stop lever to permit loads to by-pass when not blocked by said blocker leg;

upon de-energizing of said power means, said second spring means swings said blocker leg in blocking engagement with said stop lever to prevent deflection of said stop arm by a load traveling on a conveyer to stop a load with said blocker leg supporting said stop lever, said stop shaft, and said stop arm against the force and impact of a load traveling on a conveyer.

3. In apparatus as set forth in claim 1, said power means being energized to position said blocker leg in non-blocking position relative to said stop lever;

said first spring means resiliently positioning said stop lever, said stop shaft, and said stop arm in their non-stopping position;

said blocker leg being aligned and engaged cam-wise with said stop lever, when said power means is de-energized, said second spring means swings said blocker leg to blocking position and said blocker leg cams said stop lever to swing said stop lever and to move said stop shaft and said stop arm to their stopping position with said blocker leg moving to block said stop lever in its stopping position to stop a load traveling on said conveyer.

4. In apparatus as set forth in claim 1, said second spring means resiliently urging said blocker leg to non-blocker relationship relative to said stop lever;

said power means being normally not energized;

said stop lever, said stop shaft, and said stop arm being normally resiliently biased by said spring means to their non-stopping position; loads traveling on a conveyer by-passing said stop arm and not pivoting said stop shaft and said stop lever;

said blocker leg in its non-blocking position being in cam-wise engagement with said stop lever in its non-stopping position;

upon said power means being energized to swing said blocker leg to blocking position, the swing of said blocker leg in camming engagement with said lever swings said stop lever to stopping position thereby pivoting said stop shaft and said stop arm to their load stopping position against said first spring means and blocked by said blocker leg against the impact and force of a load traveling on said conveyer.

5. In apparatus as set forth in claim 1, said second spring means resiliently urging said blocker leg to non-blocking relationship relative to said stop lever when said power means is not energized;

said stop lever, said stop shaft and said stop arm being resiliently biased by said first spring means in their stopping position; loads traveling on said conveyer normally by-passing said stop arm by deflecting said stop arm out of the path of the load against said first spring means and pivoting said stop shaft and said stop lever;

a load being stopped on a conveyer by energizing said power means to swing said blocker leg against said second spring means into blocking engagement with said stop lever thereby preventing pivoting of said stop arm, said stop shaft, and said stop lever against said spring means, and against the force and impact of a load traveling on a conveyer.

* * * * *